US012429864B2

(12) United States Patent
Schuck et al.

(10) Patent No.: US 12,429,864 B2
(45) Date of Patent: Sep. 30, 2025

(54) RISK-BASED MANUFACTURING PLANT CONTROL

(71) Applicant: ANDRITZ INC., Alpharetta, GA (US)

(72) Inventors: Daniel Schuck, Rio Grande do Sul (BR); Matheus Sessim Gomes, Vitória-ES (BR)

(73) Assignee: ANDRITZ INC., Alpharetta, GA (US)

( * ) Notice: Subject to any disclaimer, the term of this patent is extended or adjusted under 35 U.S.C. 154(b) by 573 days.

(21) Appl. No.: 17/795,571

(22) PCT Filed: Jan. 20, 2021

(86) PCT No.: PCT/US2021/014083
§ 371 (c)(1),
(2) Date: Jul. 27, 2022

(87) PCT Pub. No.: WO2021/154553
PCT Pub. Date: Aug. 5, 2021

(65) Prior Publication Data
US 2023/0067083 A1    Mar. 2, 2023

Related U.S. Application Data

(60) Provisional application No. 63/002,539, filed on Mar. 31, 2020, provisional application No. 62/967,925, filed on Jan. 30, 2020.

(51) Int. Cl.
*G05B 23/02* (2006.01)
(52) U.S. Cl.
CPC ..... *G05B 23/0289* (2013.01); *G05B 23/0227* (2013.01)

(58) Field of Classification Search
None
See application file for complete search history.

(56) References Cited

U.S. PATENT DOCUMENTS

2013/0282641 A1    10/2013 Martin et al.

FOREIGN PATENT DOCUMENTS

| EP | 3336636 | 6/2018 |
| GB | 2568783 | 5/2019 |
| WO | WO 2017066350 | 4/2017 |

OTHER PUBLICATIONS

Wiliem, Leonard. Incorporating interdependence in risk likelihood analysis to enhance diagnostics in condition monitoring. Diss. Queensland University of Technology, 2008. (Year: 2008).*

(Continued)

*Primary Examiner* — Carlos R Ortiz Rodriguez
(74) *Attorney, Agent, or Firm* — Myers Bigel, P.A.

(57) ABSTRACT

Methods, systems, and apparatus, including computer programs encoded on a computer storage medium, that can adjust operations of a manufacturing plant based on an assessment of risk to the plant's operations posed by the conditions and/or operations of the different devices in the manufacturing plant. Methods may include obtaining, using a set of sensors, a set of current operational characteristics for a plurality of plant devices in a manufacturing plant. For a particular plant device, a set of risk factors corresponding to a failure of the particular plant device can be analyzed. Based on the set of risk factors, an overall risk posed by the particular plant device to operations of the manufacturing plant can be determined. Based on the overall risk, one or more operations of the manufacturing plant can be adjusted.

17 Claims, 5 Drawing Sheets

(56) References Cited

OTHER PUBLICATIONS

Bao, Huizhi, et al. "Risk-based fault diagnosis and safety management for process systems." Process Safety Progress 30.1 (2011): 6-17. (Year: 2011).*

Ahmed, Salim, Pradeep Dalpatadu, and Faisal Khan. "Conceptual framework for an event-based plant alarm system." Proceeding of the 11th World Congress on Intelligent Control and Automation. IEEE, 2014 (Year: 2014).*

Lo, Huai-Wei, et al. "A novel failure mode and effect analysis model for machine tool risk analysis." Reliability Engineering & System Safety 183 (2019): 173-183 (Year: 2019).*

Song, Qiusheng, et al. "Dynamic Semi-Quantitative Risk Research in Chemical Plants." Processes 7.11 (2019): (Year: 2019).*

International Search Report and Written Opinion in International Appln. No. PCT/US2021/014083, mailed on May 7, 2021, 11 pages.

\* cited by examiner

RISK-BASED MANUFACTURING PLANT CONTROL

CROSS-REFERENCE TO RELATED APPLICATION

This disclosure claims priority to and benefit of U.S. Provisional Patent Application Ser. No. 62/967,925, filed Jan. 30, 2020, and U.S. Provisional Patent Application Ser. No. 63/002,539, filed Mar. 31, 2020, which are incorporated herein by reference in their entirety.

BACKGROUND

This specification generally relates to adjusting operations of a manufacturing plant and/or scheduling maintenance/service (or appropriate corrective action) based on an assessment of the risk to the plant's operations posed by the conditions and/or operations of the different devices/equipment in the manufacturing plant.

Manufacturing plants (e.g., paper processing plants, metal processing plants) utilize several different types of manufacturing devices (e.g., refiners, pellet mills, centrifuges, drills, pumps, motors, gearboxes, etc.) as well as other devices (e.g., control systems, transformers, electrical systems, etc.) (collectively referred to as "manufacturing equipment," "plant devices," "manufacturing devices," or simply, "devices" or "equipment") to perform manufacturing/production operations. These devices generally include electrical, mechanical, and/or computing components that can degrade with use over time. If these devices are not adequately monitored (e.g., for signs of wear and tear) and regularly serviced, repaired, and/or replaced, their operational efficiency (e.g., the processing or manufacturing output) can reduce over time. In some instances, without adequate monitoring or timely maintenance/repairs, the components of a device (or the device as a whole) can unexpectedly fail, which can result in an unplanned reduction in the manufacturing output of the manufacturing plant or in some cases where the failed device is critical to the plant's operations, completely cut off the manufacturing output of the manufacturing plant until the failed device is repaired/replaced.

SUMMARY

In general, one innovative aspect of the subject matter described in this specification can be embodied in methods that can include the actions of obtaining, using a set of sensors, a set of current operational characteristics for a plurality of plant devices in a manufacturing plant; analyzing, for a particular plant device, a set of risk factors corresponding to a failure of the particular plant device; determining, based on the set of risk factors, an overall risk posed by the particular plant device to operations of the manufacturing plant; and adjusting one or more operations of the manufacturing plant based on the overall risk. Other embodiments of this aspect include corresponding systems, apparatus, and computer programs, configured to perform the actions of the methods, encoded on computer storage devices.

These and other embodiments can each optionally include one or more of the following features.

In some implementations, the methods can include the operation of generating a visualization of the total risk.

In some implementations, determining, based on the set of risk factors, an overall risk posed by the particular plant device to operations of the manufacturing plant, can include inputting, into a risk assessment model, an identifier for the plant device and the set of risk factors for the plant device, wherein the risk assessment model is trained on (i) historical risk factors for plant devices in the manufacturing plant and (ii) corresponding risk score representing the risk to the operations of the plant, and outputs a total risk to operations of the manufacturing plant; obtaining, from the risk assessment model, an output specifying the total risk to the operations of the manufacturing plant.

In some implementations, adjusting one or more operations of the manufacturing plant based on the overall risk can include determining that the overall risk satisfies a risk criticality threshold; in response to determining that the total risk satisfies the risk criticality threshold, adjusting one or more operational characteristics of the particular plant device.

In some implementations, determining, based on the set of risk factors, an overall risk posed by the particular plant device to operations of the manufacturing plant can include determining a weighted risk for each of a plurality of operational parameters; determining a risk probability by aggregating the weighted risk for the plurality of operational parameters; and scaling the risk probability by a device criticality for the particular plant device to obtain the overall risk.

In some implementations, adjusting one or more operations of the manufacturing plant based on the overall risk can include determining that the total risk satisfies a risk criticality threshold; and in response to determining that the total risk satisfies the risk criticality threshold, adjusting one or more operational characteristics of a plant device other than the particular plant device.

In some implementations, methods can include the operation of transmitting an alert message to an operator of the manufacturing plant when the overall risk satisfies a particular criticality threshold. Particular embodiments of the subject matter described in this specification can be implemented to realize one or more of the following advantages. The innovations described in this specification provide a more accurate assessment of the current conditions and/or operations of plant devices in a manufacturing plant, in comparison to conventional techniques. Conventionally, plant operators perform human inspections or semi-automated diagnostic tests of the different devices in the manufacturing plant. The effectiveness of these inspections/tests can be limited because they generally evaluate the current state of the different devices, provide fewer snapshots in time of the conditions and operations in the plant and even then, only provide limited information about the plant's conditions and operations (e.g., owing to the fact that inspecting certain components of a device may be difficult due to their inaccessibility). Moreover, these inspections/tests may affect the productivity of the plant (e.g., because of shutting down electrical supply to all or a portion of the plant or shutting down of one or more manufacturing devices).

In contrast, this specification describes techniques that utilize data about measured plant operational parameters (e.g., such as the parameters 210-218 identified in FIG. 2), which can include data routinely collected from sensors (e.g., motion sensors, sound sensors, vibration sensors, power sensors, flow sensors, etc.) dispersed throughout a manufacturing plant (e.g., on or around plant devices), to determine operational information about different aspects of the plant. The collected data is processed and analyzed to identify instances in which the manufacturing plant is not operating according to certain pre-defined specifications (e.g., a motor operating at a frequency that is outside its normal operational frequency range, vibrations in the manufacturing device exceed the specified range of normal vibrations for that device). Such collection and analysis of plant operations, as described in this specification, not only provides real-time information about the plant's operations and conditions, but also does not affect the productivity of the plant.

In addition, the innovations described in this specification can identify risks affecting the operations of the manufacturing plant and make appropriate adjustments (and/or generate a request for a human operator or another entity to make such adjustments) to the plant devices to manage and mitigate the risks until they can be addressed and/or eliminated (e.g., via scheduled repairs, maintenance, service, etc.). Conventionally, manufacturing devices and/or other devices (or components thereof) of a plant are replaced or serviced either periodically (e.g., on a recommended schedule specified by the device's manufacturer) or upon an identification of an issue in the device. In some instances, such replacements/service actions are often performed prematurely—i.e., these actions are performed without recognizing the criticality of the underlying issue (e.g., even though a bearing may show signs of damage, this issue may not be of high severity because the device may still be able to operate normally if its speed is reduced by 20%). As a result, conventional techniques are generally unable to maximize the life of an existing device. In contrast, the techniques describes in this specification can generate more thorough risk assessments based on a holistic analysis of the plant's operations (e.g., expected capacity of the plant, required capacity of the different devices, required and expected operational capacities of the different devices). As a result, these techniques are able to identify and implement appropriate adjustments (and/or generate a request for a human operator or another entity to make such adjustments) to plant operations that not only address these identified risks (e.g., by ordering replacement parts, performing service, adjusting operational characteristics), but do so in a manner that maximizes the life of the failing device and/or satisfies the operational requirements of the plant (e.g., reducing a device's capacity by 10% might meet the plant's capacity requirement while ensuring that the device continues to operate until a planned plant shutdown when the necessary repairs/replacements can be performed). Moreover, the techniques described in this specification can determine the appropriate service/maintenance/repairs to perform in view of the holistic plant operational analysis and can schedule such service/maintenance/repairs to be performed without limiting or otherwise jeopardizing plant operations (e.g., reducing plant operational output).

Relatedly, the innovations described in this specification can also identify opportunities to improve plant operations. In particular, the techniques described in this specification can use the assessment of the different risk factors (as briefly described above) to identify devices in the manufacturing plant whose operations can be adjusted to improve the plant's overall operations. For example, if a manufacturing device is operating at 75% of its capacity, the techniques in this specification may determine that the device's capacity can be increased by 5% without altering the expected operational life of this device.

The innovations described in this document can also evaluate the plant device based on the overall effect of the device's failure on the plant operations. For example, techniques discussed herein can differentiate between device failures (or conditions) that will completely halt plant production and device failures (or conditions) that may only limit plant output by a small amount (e.g., 2% or some other specified amount). The ability to differentiate between the impact of different device failures (or conditions) on plant output enables automated systems to suggest (or enact) plant adjustments that are appropriate given the overall risk to overall operations of the plant. For example, if a particular condition of a plant device is determined to reduce plant output by 5% until the next scheduled plant shutdown, the recommendation may be to continue plant operations until the next scheduled plant shutdown rather than shutting the plant down to address the particular condition. Meanwhile, if the particular condition is going to cause damage to other devices, which may lead to a longer plant shutdown, the recommendation may be to proceed with the plant shutdown to address the particular condition.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
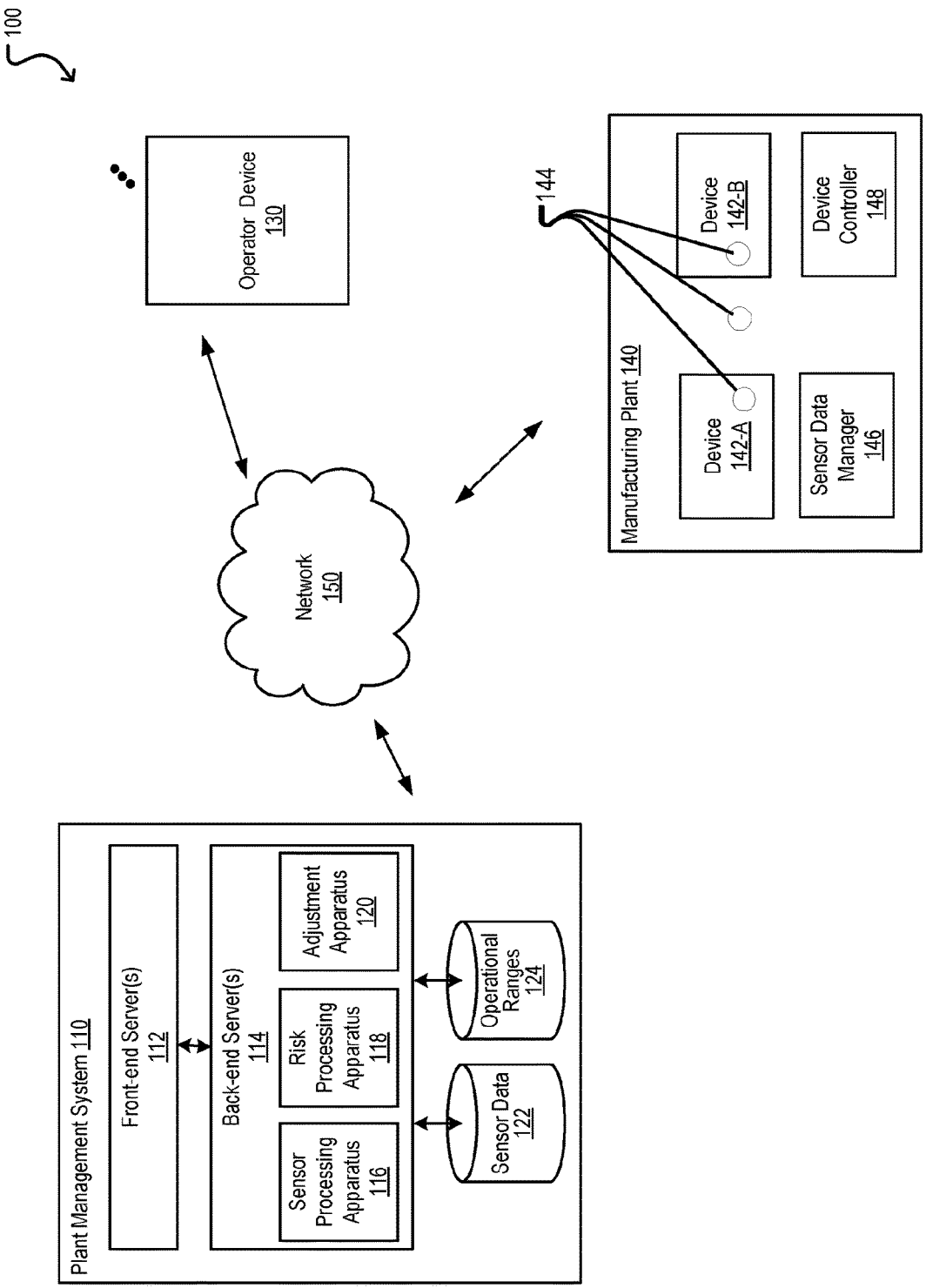
FIG. 1 is a block diagram of an example environment for monitoring and adjusting the operations of a manufacturing plant.

This document generally relates to techniques for adjusting operations of a manufacturing plant and/or scheduling maintenance/service (or appropriate corrective action) based on an assessment of risk to the plant's operations posed by the conditions and/or operations of the different devices in the manufacturing plant.

As further described below and in more detail throughout this specification, a plant management system collects and processes data about measured plant operational parameters (e.g., such as the parameters 210-218 identified and described with reference to FIG. 2), which can include data routinely collected from different types of sensors such as, e.g., vibration sensors, sound sensors, power sensors, etc., distributed throughout the manufacturing plant. The plant management system processes this data (including sensor data) to identify operational characteristics of the different plant devices in the plant and/or to identify those plant devices that are operating out of specification (i.e., for which the operational characteristics are not within an acceptable range that may be specified by a manufacturer of the device or the operator of the plant). As used in this document, an "operational characteristic" refers to a characteristic of a manufacturing device that, when adjusted, affects the operation of the manufacturing device (or some component thereof) and can include, for example, speed, frequency, power input or output, etc.

The plant management system can use the collected parameter and/or sensor data, including data about devices that are operating out-of-specification as well as other operational data, in forming a risk assessment that specifies a risk posed by a particular plant device to a plant's operations. To make such an assessment, the plant management system analyzes multiple risk factors that relate not only to the risks associated with the failure of the out-of-specification device but also to operational factors that are directly/indirectly affected by or that directly/indirectly affect the identified device. As such, the plant management system assesses the overall risk to the plant's operations for the particular device. The plant management system can use a modeling-based approach (e.g., rules-based engine, machine learning models, or another appropriate statistical model) to analyze and process various risk factors, and determine the overall risk assessment to the plant's operations.

Based on the overall risk assessment, the plant management system generates and/or triggers implementation of a corrective action plan. This corrective action plan can include an adjustment (or a prescribed adjustment to be implemented, e.g., by a human operator or another entity) of the plant operations, which can include an adjustment of the operational characteristics of the out-of-specification device and/or an adjustment of other plant devices in the plant. The corrective action plan can also include external actions, such as suggesting or automatically ordering replacement parts, scheduling service/repairs/maintenance, etc. In some instances, the corrective action need not be mitigating a risk to the plant's operations; rather, it may be adjusting one or more plant operations to optimize the plant operations. For example, even if the plant's operations are not subject to much, if any, risk, the plant management system may nevertheless identify opportunities for adjusting plant operations that optimize (e.g., improve production capacity or output) plant's operations. The plant management system can trigger implementation of the corrective action plan by physically adjusting settings of plant equipment, generating communications that are transmitted to other devices, and/or generating alerts (e.g., audible or visual alerts).

In some instances, the plant management system can also generate a visualization (e.g., graphical representation), which can be accessed by plant operators at operator devices (e.g., computing devices). The visualization provides, for example, text and/or graphs (or other graphical information) describing and/or showing the current operational and risk reports, which identify the issues, the corrective actions, the risk criticality, and any planned adjustment actions and/or operational characteristics that the plant management system is recommending for adjustment.

These and other features are more fully described in the descriptions below.

FIG. 1 is a block diagram of an example environment 100 in which a plant management system 110 monitors and adjusts the operations of a manufacturing plant.

The example environment 100 includes a network 150, such as a local area network (LAN), a wide area network (WAN), the Internet, a mobile network, or a combination thereof. The network 150 connects the plant management system 110, one or more operator devices 130, and one or more manufacturing plants 140. Although the below description describes a single manufacturing plant 140 being controlled/monitored by the plant management system 110, in some implementations, multiple manufacturing plants 140 may be controlled/monitored by the plant management system 110.

Manufacturing plant 140 (which is also referred to as "plant" in this specification) is an industrial site at which goods, products, or other materials are manufactured, produced, or otherwise processed. In general, a manufacturing plant includes multiple plant devices 142-A and 142-B, which can include manufacturing devices (which are also referred to in this specification as machines) that are used in the manufacturing/production process as well as other devices that are necessary for the plant's operations (e.g., control systems, networking apparatus, electrical framework, etc.). Although the manufacturing plant 140 illustrated in FIG. 1 includes two plant devices 142-A and 142-B, manufacturing plants can include any number and type of devices that are required to perform the appropriate manufacturing/production processes of the plant 140.

A number of different sensors (e.g., motion sensors, vibration sensors, sound sensors, etc.) can be dispersed throughout the plant 140. As shown in FIG. 1, plant devices 142-A and 142-B include (i.e., on the device or in its vicinity) a sensor 144. For example, vibration sensors may be placed next to or near bearings, shafts, motors, etc. Also, the plant 140 includes a sensor 144 that is not included on or in the vicinity of any device. Although three sensors are shown in FIG. 1, the plant 140 can include any number of sensors dispersed throughout the plant. Data can also be collected regarding measured parameters (such as the parameters 210-218 and 250) as further described with reference to FIG. 2.

The example environment 100 also includes one or more operator devices 130. An operator device 130 is an electronic device that an operator of the plant 140 uses to, e.g., access operations of the plant, generate reports based on data (e.g., vibration and sound data for a particular manufacturing device over a particular period) stored in the plant management system 110 (as described below), and to initiate or schedule actions that result in effecting control over certain aspects of the plant 140 (e.g., adjusting certain operational characteristics of the devices in the plant 140). Example operator devices 130 include personal computers, tablet devices, mobile communication devices, digital assistant devices, augmented reality devices, and other devices that can send and receive data over the network 104. An operator device 130 typically includes a user application, such as a web browser, to facilitate the sending and receiving of data over the network 150, but native applications executed by the user device 130 can also facilitate the sending and receiving of content over the network 150.

The example environment 100 also includes a plant management system 110, which generally monitors and controls the operations of the different plant devices (142-A, 142-B) of the plant 140. The plant management system 110 obtains data from the different sensors 144 in the manufacturing plant 140. Data from the sensors can be transmitted via a communication interface (such as Bluetooth or other nearfield communication interface) to a sensor data manager 146 (which can include a wireless gateway) within the plant 140. The sensor data manager 146 consolidates the sensor data received from the different sensors 144 and then transmits this consolidated sensor data to the plant management system 110.

The plant management system 110 includes one or more front-end servers 112 and one or more back-end servers 114. The front-end servers 112 can transmit data to, and receive data from, operator devices 130 over the network 150. For example, the front-end servers 112 can provide, to an operator application 132 executing on an operator device 130, interfaces or data for presentation with the interfaces. The front-end servers 112 can also receive data specifying operator's interactions with the interfaces of the application 130. The front-end servers 112 can update the interfaces, provide new interfaces, and/or update the data presented by the interfaces based on user interactions with the application 132.

The front-end servers 112 can also communicate with the back-end servers 114. For example, the front-end servers 112 can identify data that is to be processed by the back-end servers 114, e.g., data specifying operational characteristics to be updated in manufacturing devices, and provide the identified data to the back-end servers 114. The front-end servers 112 can also receive data from the back-end servers 114, e.g., data regarding current operational states of different manufacturing devices (e.g., summary of vibration and sound data for a manufacturing device, a flow analysis of a set of devices, a summary of pending and/or expected work orders for a device), and transmit the data to the operator device 130 over the network 150.

The back-end servers 114 include a sensor processing apparatus 116, a risk processing apparatus 118, and an adjustment apparatus 120. The operations of these apparatuses is summarized below and is described in detail with reference to FIGS. 2 and 3.

The sensor processing apparatus 116 processes the sensor data that is received from the sensor data manager 146 and stored in the sensor data storage device 122. The sensor processing apparatus processes the sensor data to determine the operational characteristics for the different plant devices 142-A and 142-B. The sensor processing apparatus also obtains operational specifications (i.e., specified operational ranges) for the different plant devices from the operational ranges storage device 124 and uses this data to identify devices that are operating outside these ranges.

The risk processing apparatus 118 determines an overall risk posed by a particular plant device on the plant's operations. As further described with reference to FIGS. 2 and 3, the risk processing apparatus 118 analyzes multiple risk factors/parameters relevant to the identified device (e.g., risk associated with the failure of the device, risk based on plant's actual and expected capacity and outputs, risks for other devices interfacing with or connected to the particular device) and uses these factors to determine an overall risk assessment to the plant's operations. Each of the storage devices—sensor data storage device 122 and operational ranges storage device 124—is a non-transitory computer readable medium that can include one or more databases or other data structures. Additional details regarding the assessment and computation of overall risk is described with reference to FIG. 2 below.

Based on the total risk assessment, the adjustment apparatus 120 determines an adjustment plan, which can include current adjustments to the operational characteristics of one or more plant devices (e.g., reduce operational speed, increase power draw, etc.) as well as scheduled adjustments to the particular plant device (e.g., order replacement parts, schedule replacement, service, maintenance, etc.). The adjustment apparatus 120 sends a current adjustment action, via the network 150, to the device controller 148 in the plant 140. The device controller 148 converts the received actions into appropriate signals and/or messages that it sends to one or more identified plant devices, which in turn use these signals to adjust (e.g., by flipping switches, rotating knobs, or activating/controlling other digital controls) one or more operational characteristics of the identified device. Additionally, or alternatively, the adjustment apparatus 120 can send a maintenance/repair plan to a plant operator (including an identification of the particular maintenance and/or repair items, a timeline in which to implement such maintenance and/or repair, and the required resources/parts for such maintenance/repair) and/or can order the appropriate replacement parts/service that is/are needed for such maintenance and/or repair FIG. 2 is a block diagram illustrating the components of FIG. 1 that monitor and adjust the operations of a manufacturing plant based on an assessment of the risk to the plant's operations.

Figure 2:
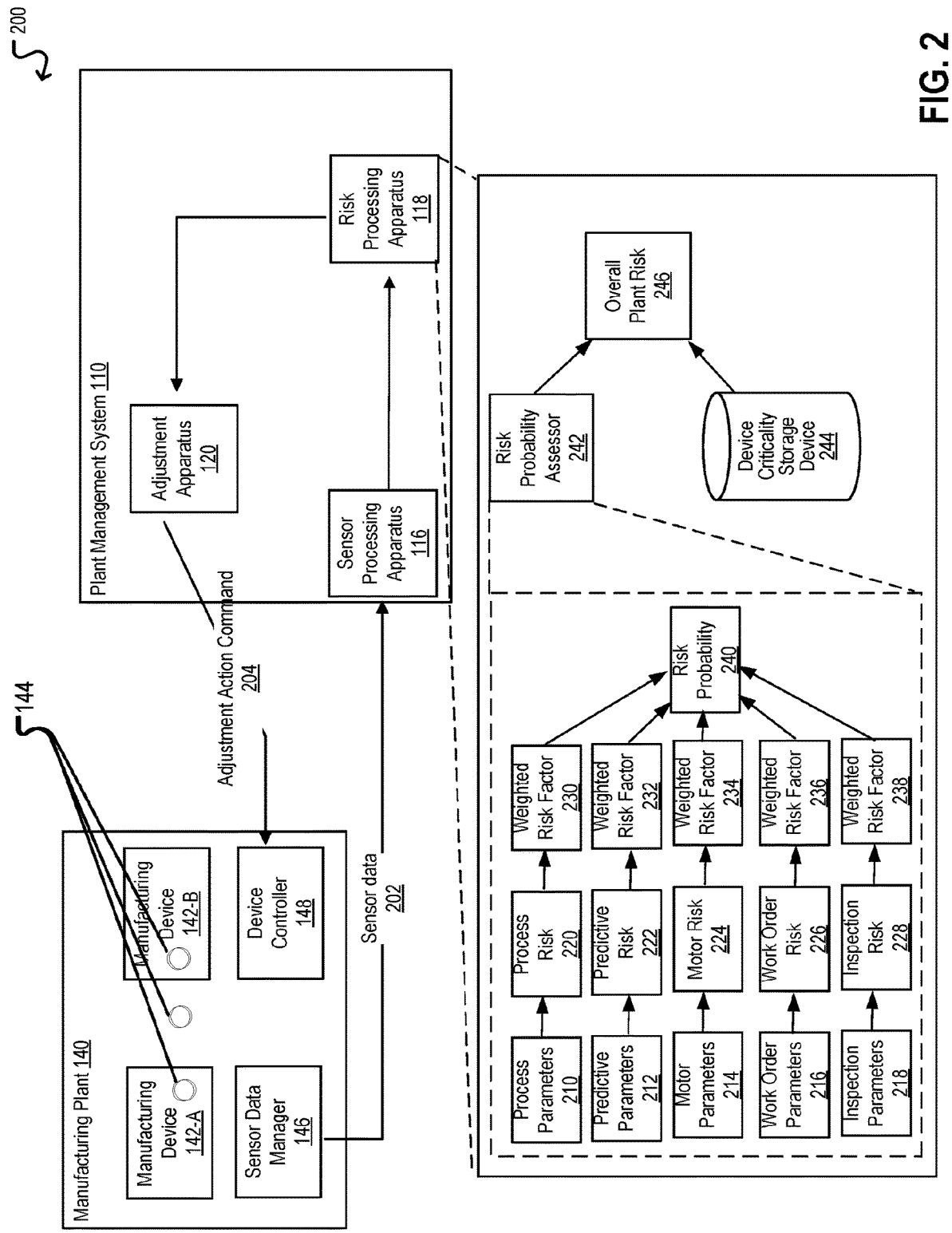
FIG. 2 is a block diagram illustrating the components of FIG. 1 that monitor and adjust the operations of a manufacturing plant based on an assessment of the risk to the plant's operations.

As shown in FIG. 2, the sensors 144 located throughout the plant 140 constantly or periodically (e.g., every second, every minute, every five minutes, every hour, etc.) record data (e.g., vibration data, sound data, for a manufacturing device, sound data for a manufacturing device, etc.). As described with reference to FIG. 1, each sensor transmits this data to the sensor data manager 146, which collects/aggregates the data received from different sensors across the plant as a set of sensor data 202 to the plant management system 110.

In some implementations, the sensor data 202 identifies the sensor with which each respective data item is associated. For example, the data originating from each sensor can include metadata in the form of a tag that uniquely identifies the sensor (e.g., "Sensor ID=32114") that recorded that data. Accordingly, portions of the sensor data 202 are also be delineated based on the tags that uniquely identify the sensor.

Each sensor in the plant 140 is associated with (i.e., assigned to) at least one device. For example, a sensor located on or near a particular device is assigned to this device. In some implementations, sensors may be assigned to a single device, a subset of devices in the plant 140, or all the devices of the plant 140. For example, a sound sensor may be assigned to a subset of devices when it records sounds emanating from this subset of devices. Similarly, a flow rate sensor may also be assigned to devices when it measures the flow rate through this subset of devices. As another example, a power sensor may be assigned to all devices of the plant when it measures the overall power draw by the plant's devices. In some implementations, the sensors may also be associated with (i.e., assigned to) particular components of the device. For example, a device may include two vibration sensors: one positioned close to a bearing and another positioned next to a shaft. In such an example, the sensor is associated not only with the device but with the particular component of the device (e.g., shaft, bearing, etc.).

An operator of the plant 140 can configure the plant management system 110 to store, e.g., in a database, the associations between different sensors and the devices (and in some cases, the components of the devices as well) (as described above). As a result, when the sensor data 202 is received from the plant 140, the plant management system 140 uses the received sensor identifier to look up the associated device/s (and in some case, the associated components of these devices) corresponding to the sensor data. Once the device/s (and component/s) associated with (i.e., assigned to) the received sensor data is/are identified, the plant management system 110 routes the sensor data 202 to the sensor processing apparatus 116.

The sensor processing apparatus 116 processes the sensor data 202 to determine operational characteristics of the plant device/s associated with the sensors. In some implementations, a lookup table can include relationships between different sensor data and operational characteristics for the device. The sensor processing apparatus 116 can use the sensor data for a particular device to identify the corresponding operational characteristics for this device from the lookup table. The lookup table can include a one-to-one association between a type of sensor data (e.g., vibration, sound) and an operational characteristic of the device. In some implementations, the lookup table can include a many-to-one association between different types of sensor data and an operational characteristic of the device. In some implementations, the lookup table can include a many-to-many association between different types of sensor data and operational characteristics of the device.

In some implementations, the sensor data for a particular sensor associated with a particular device may need to be processed before the lookup table is accessed to determine the operational characteristic of the device. For example, the sensor processing apparatus 116 may first convert the vibration data received from a sensor located on a particular manufacturing device into a vibration signature, which can include, e.g., analyzing one or more frequencies, amplitudes, or phase information at a particular snapshot in time or over certain time intervals. The sensor processing apparatus 116 uses this vibration signature to identify, using the lookup table, the corresponding operational characteristic of operational speed. In some implementations, the sensor data for a particular sensor is already in a form that can be used to directly identify, using the lookup table, the corresponding operational characteristics of a device. For example, the format of data received from a digital power sensor may be in the same form as the corresponding power sensor data stored in the lookup table.

In some implementations, instead of a lookup table, a model (e.g., a machine learning model, such as a neural network) can be used to determine operational characteristics of a device based on input sensor data for that device. In the case of a machine learning model, the model can be trained using known associations between sensor data and operational characteristics. Once trained, the model can accept as an input sensor data for a device/component and output the corresponding operational characteristics of the device. Such a model-based approach may be desirable when the number of sensors, devices/components, and their various associations are numerous and can vary by device and/or sensor. The sensor processing apparatus 116 provides the determined operation characteristics of different devices to the risk processing apparatus 118.

The risk processing apparatus 118 determines the overall risk to plant operations based on a particular device. The risk processing apparatus 118 determines this overall risk for a particular plant device using a risk probability assessor 242 and a device criticality assessor storage device 244, each of which is described below.

The risk probability assessor 242 analyzes multiple categories of operational parameters that are directly and indirectly related to a device, in determining a risk probability 240, which represents the risk posed by a particular device. As shown in FIG. 2, the different categories of parameters can include: process parameters 210, predictive parameters 212, motor parameters 214, work order parameters 216, and inspection parameters 218. Each of these parameters and their associated risk probability computations are described below.

Process parameters 210 describe or measure operational conditions that affect (directly or indirectly) the lifespan or overall health of a particular plant device. Examples of process parameters include steam temperature, steam pressure, flow rate, extraction pressure, and tank level. Values for each of the process parameters can be determined using sensor data received by the risk processing apparatus 118 from the sensor processing apparatus 116. For each of the process parameters, a key performance indicator (KPI) can be maintained that defines different thresholds of operation performance of the particular device. For example, the steam pressure KPI for a particular device can be maintained such that (1) for temperatures in the range of 65-85° C., the KPI would be 100%, (2) for temperatures in the range of 55-64° C., the KPI would be 80%, (3) for temperatures in the range of 45-54° C., the KPI would be 60%, (4) for temperatures in the range of 35-44° C., the KPI would be 40%, (5) for temperatures in the range of 25-34° C., the KPI would be 20%, and (6) for temperatures in the range of 0-24° C., the KPI would be 0%. In this example, if the actual steam pressure for a particular device is 65° C., the KPI value for that parameter would be 80%. For each process parameter, an individual risk value is determined. In some implementations, the individual risk value for a process parameter can be computed by subtracting the KPI value for that parameter from 100%. Thus, if the KPI value is determined to by 80%, the risk value for that process parameter is 20% (i.e., 100%-80%).

The individual risk values for each of the process parameters are then consolidated to determine the process risk 220. In some implementations, the process risk 220 can be determined by computing an average of the individual risk values for each process parameter. In other implementations, the process risk 220 can be determined by selecting the highest (i.e., maximum) individual risk value for the different process parameters. The process risk is scaled by a weighted risk factor, which is specific to the particular device. For example, if the process risk 220 is determined to be 40% (or 0.4) and the weight risk factor for the process parameters is specified as 20% (0.2), the weighted risk for the process parameters is 0.08 (i.e., 0.2*0.4).

Predictive parameters 212 describe or measure parameters (e.g., vibrations or temperatures) of a particular plant device that can be used to predict the health or lifespan of the device over a period of time. Examples of predictive parameters include overall vibration, axial displacement, and bearing temperature. Values for each of the predictive parameters 212 can be determined using sensor data (e.g., vibration sensor data, temperature sensor data) received by the risk processing apparatus 118 from the sensor processing apparatus 116. For each of the predictive parameters, a key performance indicator (KPI) can be maintained that defines different thresholds of operation values, e.g., for temperature and pressure, of the particular device. For each predictive parameter, an individual risk value is determined. In some implementations, the individual risk value for a predictive parameter can be computed by subtracting the KPI value for that parameter from 100%. Thus, if the KPI value is determined to be 80%, the risk value for that predictive parameter is 20% (i.e., 100%-80%). The individual risk values for each of the predictive parameters are then consolidated to determine the predictive risk 222. In some implementations, the predictive risk 222 can be determined by computing an average of the individual risk values for each predictive parameter. In other implementations, the predictive risk 220 can be determined by selecting the highest (i.e., maximum) individual risk value for the different predictive parameters. The predictive risk 222 is scaled by a weighted risk factor 232, which is specific to the particular device. For example, if the predictive risk 222 is determined to be 50% (or 0.5) and the weight risk factor for the predictive parameters is specified as 30% (0.3), the weighted risk for the predictive parameters is 0.15 (i.e., 0.5*0.3).

Motor parameters 214 describe or measure operational parameters of the motor(s) in a particular plant device. Examples of motors parameters include average running load, time above nominal load, time above service factor, load variability, and start/stop frequency. Values for each of the motor parameters 214 can be determined using sensor data (e.g., power sensor data) and/or current (e.g., amperage) data received by the risk processing apparatus 118 from, e.g., the sensor processing apparatus 116. For each of the motor parameters, a key performance indicator (KPI) can be maintained that defines different thresholds of operation values for the motor(s) of the particular device. For each motor parameter, an individual risk value is determined. In some implementations, the individual risk value for a motor parameter can be computed by subtracting the KPI value for that parameter from 100%. Thus, if the KPI value is determined to by 80%, the risk value for that motor parameter is 20% (i.e., 100%-80%). The individual risk values for each of the motor parameters are then consolidated to determine the motor risk 224. In some implementations, the motor risk 224 can be determined by computing an average of the individual risk values for each motor parameter. In other implementations, the motor risk 224 can be determined by selecting the highest (i.e., maximum) individual risk value for the different motor parameters. The motor risk 224 is scaled by a weighted risk factor 234, which is specific to the particular device. For example, if the motor risk 224 is determined to be 50% (or 0.5) and the weight risk factor for the motor parameters 234 is specified as 30% (0.3), the weighted risk for the predictive parameters is 0.15 (i.e., 0.5*0.3).

Work order parameters 216 specify the impact of outstanding work order(s) on the operation of a particular plant device. Data about work orders can be obtained from a system that stores all current and past work orders for different plant devices. Examples of work order parameters include the priority of the work orders, which can specify how quickly work on a particular work order must begin, the amount of work/parts required, and effect on the current operations of the device as well as the future operations of the device during the work to be performed under the work order. As such, for each work order, an individual risk value is determined based on one or more risk factors for the work order, including, e.g., the number of days that the work order has been active or outstanding, the required time to perform the work for the work order, any spare parts that are needed, etc. In some implementations, the individual risk value for a work order can be computed by (1) assigning a weight to each work order risk factor with a corresponding value for that factor and (2) generating an aggregated weighted risk using the risk factor weights and their corresponding values. For example, assume a scenario in which a work order has been outstanding for five days, requires special parts that are not in stock, and requires the device to be shutdown for the repairs to be performed. In this example scenario, there are three risk factors, each of which is assigned a weight and a corresponding value: number of days work order has been pending (weight: 20% or 0.2; value: 40% or 0.4), parts required (weight: 30% or 0.3; value: 80% or 0.8), and device operation during shutdown (weight: 50% or 0.5; value: 100% or 1). The individual risk for the work order is computed by computing an aggregated weighted risk for the weights and the corresponding values for the different factors: 0.2*0.4+0.3*0.8+0.5*1=0.82 (or 82%).

In some implementations, a plant operator may pre-specify a weight for the different factors that are used in computing the work order's risk for a particular device. In some implementations, the plant operator may also specify the value for each of the different factors based on an evaluation of a particular work order. Alternatively, a rules-based engine can be used to determine values for different factors. Such a rules-based engine can have pre-defined rules that specify thresholds that are compared against actual values from the work order to determine a value for the risk factor. In some implementations, the work order risk 226 can be determined by computing an average of the individual risk values for each work order. In other implementations, the work order risk 226 can be determined by selecting the highest (i.e., maximum) individual risk value for the different work orders. The work order risk 226 is scaled by a weighted risk factor 236, which is specific to the particular device. For example, if the work order risk 226 is determined to be 50% (or 0.5) and the weight risk factor for the different work orders for a device 236 is specified as 30% (0.3), the weighted risk for the work orders is 0.15 (i.e., 0.5*0.3).

Inspection parameters 218 describe unfavorable physical conditions in the plant (e.g., on the production floor) that are recorded by field inspectors. Examples of inspection parameters include unsafe conditions, cleanliness, noise, leakage, etc. Values for each of the inspection parameters 214 can be determined using data collected by plant operators/field inspectors based on, e.g., visual and/or tactile inspection of the physical conditions of devices and/or the plant in general. In some implementations, the individual risk value for each inspection parameter specifies the impact on the device's operations if the inspection parameter is left uncorrected. For example, if the inspection parameter of cleanliness is not—and will not—affect the expected operation of a plant device, then the individual risk value for this parameter may be specified as 10% (or 0.1). Alternatively, if this parameter is negatively reducing the efficiency of the device by 50%, then the individual risk value for this parameter may be 80%. In some implementations, a rules-based engine can be used to specify rules that are used to determine risk values based on the impact of an inspection parameter on a device's operations. Such a rules-based engine can have pre-defined rules that specify thresholds that are compared against actual values to determine an individual risk value. In some implementations, the inspection risk 228 can be determined by computing an average of the individual risk values for each inspection parameter. In other implementations, the inspection risk 226 can be determined by selecting the highest (i.e., maximum) individual risk value for the different inspection parameters. The inspection risk 228 is scaled by a weighted risk factor 238, which is specific to the particular device. For example, if the inspection risk 228 is determined to be 50% (or 0.5) and the weight risk factor for the different inspection parameters is specified as 30% (0.3), the weighted risk for the inspection parameters is 0.15 (i.e., 0.5*0.3).

Valve parameters 250 describe or measure operational parameters of the valve(s) in a particular plant device. Examples of valve parameters include actuator health, flow rate, valve wear rate, and time of use. Values for each of the valve parameters 250 can be determined using data from, e.g., smart sensors (such as pressure sensors, flow sensors, etc.) attached to or near the valve (or another location suitable for measuring operational parameters of the valve)

that is received by the risk processing apparatus 118 from, e.g., the sensor processing apparatus 116. For each of the valve parameters, a key performance indicator (KPI) can be maintained that defines different thresholds of operation values for the valve(s) of the particular device. For each valve parameter, an individual risk value is determined. In some implementations, the individual risk value for a valve parameter can be computed by subtracting the KPI value for that parameter from 100%. Thus, if the KPI value is determined to be 80%, the risk value for that valve parameter is 20% (i.e., 100%-80%). The individual risk values for each of the valve parameters are then consolidated to determine the valve risk 252. In some implementations, the valve risk 252 can be determined by computing an average of the individual risk values for each valve parameter. In other implementations, the valve risk 252 can be determined by selecting the highest (i.e., maximum) individual risk value for the different valve parameters. The valve risk 252 is scaled by a weighted risk factor 254, which is specific to the particular device and/or valve. For example, if the valve risk 252 is determined to be 50% (or 0.5) and the weight risk factor for the valve parameters 254 is specified as 30% (0.3), the weighted risk for the valve parameters is 0.15 (i.e., 0.5*0.3).

Although six categories of parameters are shown in FIG. 2 (and described above), additional parameters/factors can be considered and analyzed in the same manner as further described below. Examples of such additional (non-limiting) factors are described below.

For example, in some implementations, the operational parameters that are directly and/or indirectly related to a device, can include digital security/cybersecurity risks posed to a device and/or its operation. This includes, e.g., cybersecurity risks or other security risks to digital assets (e.g., servers, computing devices) that are relied upon or otherwise used during the operation of the plant device (e.g., for data storage, retrieval, and/or processing). As such, digital security parameters can be specified, which describe or measure operational and/or security parameters of the digital assets relied upon or otherwise used during the operation of the particular plant device. Examples of digital security parameters include server health/security for servers/storage devices/computing devices used during operation of the particular plant device, previous security issues/threats with respect to these devices/servers, expected use times/longevity of these devices/servers, etc. Values for each of the digital security parameters can be determined using data from, e.g., digital sensors, network monitors, or diagnostic services corresponding to these devices/servers, from other systems that maintain operational data about these devices/servers, etc. For each of the digital security parameters, a key performance indicator (KPI) can be maintained that defines different thresholds of operation values for the different digital assets (i.e., servers, storage devices, or other computing devices) relied upon or using the operation of the particular device. For each digital security parameter, an individual risk value is determined. In some implementations, the individual risk value for a digital security parameter can be computed by subtracting the KPI value for that parameter from 100%. Thus, if the KPI value is determined to be 80%, the risk value for that digital security parameter is 20% (i.e., 100%-80%). The individual risk values for each of the digital security parameters are then consolidated to determine the digital security risk. In some implementations, the digital security risk can be determined by computing an average of the individual risk values for each digital security parameter. In other implementations, the digital security risk can be determined by selecting the highest (i.e., maximum) individual risk value for the different digital security risk parameters. The digital security risk is scaled by a weighted risk factor, which is specific to the particular plant device and/or the digital asset that is relied upon or otherwise used during operation of the plant device. For example, if the digital security risk is determined to be 50% (or 0.5) and the weighted risk factor for the digital security parameters is specified as 30% (0.3), the weighted risk for the digital security parameters is 0.15 (i.e., 0.5*0.3).

As one example, the risk probability assessor 242 can determine the expected operational time with and without any corrective actions (e.g., repairs, replacement, etc.) for the particular issue in the operation of the plant device. In some implementations, the risk processing apparatus 118 can uses a script to identify and aggregate information from the work orders, maintenance items, and/or service logs to determine, for a particular issue, the average expected life of device (or a component of the device) without the required service/repair as well as with the service/repair. The risk processing apparatus 118 can average this information across the different identified records for the particular issue. The rules-based engine assigns a score ranging from zero to one based on the determined expected operational time with and without the corrective actions. For example, the rules-based engine assigns a score closer to one when the expected operational time without the corrective action is high and a score closer to zero when the expected operational time without the corrective action is low. As another example, the rules-based engine assigns a score closer to one when the expected operational time with the corrective action is high and a score closer to zero when the expected operational time with the corrective action is low.

As another example, the risk probability assessor 242 can use the expected and current lifetime of the device, e.g., as specified by the manufacturer of the device or the component (e.g., in product or operational manuals) to determine the expected remaining life for the device. For example, if the device (or a component thereof) has an expected operational life of three years and the device (or its component) has been operating for two years, then the risk probability assessor 242 can determine that the device has only 33% of life remaining (i.e., estimated life remaining divided by total estimated life). The rules-based engine assigns a score ranging from zero to one based on the determined estimated remaining life of the device. For example, the rules-based engine assigns a score closer to one for a greater estimated remaining life and a score closer to zero for a lower estimated remaining lie.

As another example, the risk probability assessor 242 can also use information about the maximum and minimum possible operational capacity of the device to determine whether the current operational capacity of the device can be increased or decreased. For example, if the current operational capacity of the device is at 80%, while the range of the possible capacities for the device ranges from 50-95%, the risk probability assessor 242 determines that the capacity of the device can be reduced by 30% (80%-50%). The rules-based engine assigns a score ranging from zero to one based on how much the operational capacity of the device can be increased or decreased. For example, the rules-based engine assigns a score closer to one when a greater reduction in operational capacity is possible and a score closer to zero when a lesser reduction in operational capacity is possible.

As another example, the risk probability assessor 242 can analyze the impact of other devices whose capacity and operation is affected by the capacity and outputs of the particular device. For example, if the out-of-specification device is one of multiple identical devices that perform the same function, the risk probability assessor 242 can evaluate whether the capacity of the other identical devices can be increased. The rules-based engine assigns a score ranging from zero to one based on whether (and by how much) the operational capacity of other identical devices can be increased. For example, the rules-based engine assigns a score closer to one when the operational capacity of other identical devices can be increased and a score closer to zero when the operational capacity of other identical devices cannot be increased.

Relatedly, if the output of an out-of-specification device (i.e., a device for which it is determined that the actual operational characteristics are not within the range of acceptable operational characteristics) directly affects or is affected by the capacity of another downstream or upstream device, the risk probability assessor 242 can also analyze the impact of any adjustments to the out-of-specification device on those other devices. For example, if the output of the out-of-specification device is used by another device but that other device can only process 60% of the current output of the out-of-specification device within a 24-hour period, then the risk probability assessor 242 can determine that the daily output of the out-of-specification device can be reduced by 40% (100%-60%) without affecting the overall output of the plant 140. The rules-based engine assigns a score ranging from zero to one based on whether (and by how much) the operational capacity of the out-of-specification device can be adjusted (e.g., reduced) without negatively impacting the operations (e.g., capacities and operations of any downstream devices). For example, the rules-based engine assigns a score closer to one when the operational capacity of the out-of-specification device can be adjusted without much impact on the plant's operations and a score closer to zero when the operational capacity of the out-of-specification device can be adjusted only with significant negative impact on the plant's operations (e.g., reduction in the plant's total capacity).

As another example, the risk processing apparatus 118 can also use the timing of planned plant shutdowns (or similar events in which operations of all or a portion of the plant are slowed or shut down) to schedule repairs/maintenance as well as to determine the duration for which temporary adjustments (e.g., reducing capacity of the out-of-specification device) need to be made until repairs/replacements can be performed. The rules-based engine assigns a score ranging from zero to one based on the duration for which temporary adjustments (e.g., reducing capacity of the out-of-specification device) need to be made until repairs/replacements can be performed. For example, the rules-based engine assigns a score closer to one when the adjustments are needed only for a short duration, and a score closer to zero when the adjustments are needed for a long duration.

As another example, the risk processing apparatus 118 can also use the total required output of the plant to determine, e.g., if any potential reductions in the capacity of the out-of-specification device (e.g., 5% capacity reduction) can nevertheless meet the total required output over a certain period. The rules-based engine assigns a score ranging from zero to one based on whether adjustments can be made to the out-of-specification device to meet expected plant output for a certain period. For example, the rules-based engine assigns a score closer to one when the adjustments can be made to the out-of-specification device to meet expected plant output for a certain period, and a score closer to zero when adjustments cannot be made to the out-of-specification device to meet expected plant output for a certain period. Although the above descriptions includes an assessment of rules for a certain set of risk factors, other risk factors can similarly be analyzed, processed, and factored into the risk assessment.

The risk probability assessor 242 computes the risk probability 240 by aggregating the weighted risk values for each of the parameters (process parameters, predictive parameters, motor parameters, work order parameters, inspection parameters, valve parameters, and/or any other parameters). In some implementations, this value is computed by summing the weight risk values for each of the parameters and dividing this number by the sum of the weighted risk factors (230-238 and 254) for each of the parameters (210-218 and 250). The resulting value is the risk probability 240 for the particular plant device. In some implementations, where additional factors are analyzed (as described above), the risk probability assessor 242 further weights the scores for each of these factors and then aggregates (e.g., sums) the weighted scores for the different factors (and adds these to the weighted risk value for the different parameters). In some implementations, the weighted sum of the scores can be normalized (e.g., to a value within the range of from zero to one).

In some implementations, the risk probability assessor 242 can be implemented, e.g., as a rules-based engine, a machine learning model, or other appropriate model. In the case of a rules-based engine, this engine includes a set of rules that are used to determine the risk probability 240. In some implementations, an operator may assign each of the parameters 210-218 and 250, a weight (e.g., a value ranging from zero to one, where zero specifies that the factor has no effect on the overall risk assessment and one specifies that the factor has significant impact on the overall risk assessment). The rules-based engine assigns scores (e.g., values ranging from zero to one) based on the processing of the rules with respect to each of the factors, determines a weighted score for each factor (e.g., by multiplying the weight with the assigned score), and aggregates the weighted scores for the different factors to generate a total risk score. In some instances, the total risk score can be normalized to be a value between zero and one.

In some implementations, instead of a rules-based engine, the risk probability assessor 242 can utilize a statistical model, such as a machine learning model, to determine a total risk score. When utilizing a machine learning model, the model can include features that correspond to the different factors analyzed by the rules-based engine described above. Each feature can initially be assigned a zero weight, which can be adjusted as the model is trained. The machine learning model may be trained with a set of data for each plant device. This training set of known operational data for a particular device, which can be obtained from, e.g., work orders, maintenance requests, and service logs (e.g., to identify prior issues, expected time of operation with and without any corrective actions, etc.), product manuals (e.g., to identify estimated duration of parts, recommended service items and schedule), plant operational details (e.g., which specify total expected output over a certain period, current production capacity of the plant, etc.). Each record in the training set includes the values for the different factors described above (with reference to the rules-based engine) and a label identifying the determined criticality of an out-of-specification device on the plant's operations. Once trained, the machine learning model accepts as inputs the values for the various factors and determines the criticality of the out-of-specification device's impact on the plant's operations.

Each plant device is associated with a corresponding device criticality value in the device criticality storage device 244. The device criticality value is based on the criticality of the device to the process, safety, environment, plant production, plant quality parameters, and/or the overall plant's operations. In some implementations, a plant operator can specify and store in the device criticality storage device 244, the criticality value for each of the plant devices. In such implementations, a particular plant device's criticality is determined by looking up the device's identifier in the device criticality storage device 244 and obtaining the corresponding device criticality value for that device. In some implementations, the plant operator can specify and store in the device criticality storage device 244, the criticality value for a group of devices. For example, the plant operator can group certain essential devices and assign a device criticality value of 100% (or 1), while grouping another set of devices as quality control devices, to which a device criticality value of 55% (or 0.55) is assigned. In such implementations, a particular plant device's criticality is determined by first determining which group of devices a particular device belongs to (such data may be stored in the device criticality storage device 244 or in a separate storage device). Then, using the group of devices to which a particular device is assigned, the corresponding criticality value stored in the device criticality storage device 244 is obtained.

The risk processing apparatus 118 determines the overall plant risk 246 by scaling the risk probability 240 by a device criticality value obtained from the device criticality storage device 244. In some implementations, the overall plant risk is determined by multiplying the risk probability 240 by the device criticality value.

The risk processing apparatus can assign different criticality levels based on the overall plant risk 246. The overall plant risk 246, whether reflected as a weighted sum or a normalized score, represents the total risk to the plant's operations. In some implementations, an operator can specify different criticality levels, which are based on different thresholds of the overall plant risk. Examples of the criticality levels and the corresponding thresholds are provided below. For example, an overall plant risk 246 ranging from 0 to 0.2 might be assigned a "SEVERE" criticality, an overall plant risk 246 ranging from 0.2 to 0.4 might be assigned a "HIGH" criticality, an overall plant risk 246 ranging from 0.4 to 0.6 might be assigned a "MEDIUM" criticality, an overall plant risk 246 ranging from 0.6 to 0.8 might be assigned a "LOW" criticality, and an overall plant risk 246 ranging from 0.8 to 1.0 might be assigned a "HEALTHY" criticality. Additional, fewer, or different criticality levels and threshold can also be used.

Based on the determined criticality level, the adjustment apparatus 120 determines a corrective action plan. The corrective action plan can specify an adjustment action for one or more devices of the plant, identify repair/service plans that may require external action (e.g., ordering and receiving replacement parts, scheduling service personnel to perform the necessary repairs/replacements, etc.), and/or generate alerts for the operator. As used in this specification, a device adjustment action is a command or an instruction that specifies and/or causes the adjustment of an operational characteristic of a device.

In some implementations, the adjustment apparatus 120 may access a database (or other storage device) that includes a lookup table identifying, for each plant device, an identified issue, a criticality level, and the appropriate corrective action plan. In such implementations, the adjustment apparatus 120 obtains from this database the corrective action plan for an identified issue and determined criticality level. In some implementations, instead of a database, a statistical model (such as a machine learning model) can be used to generate a corrective action plan for a particular input issue and criticality level. Such a machine learning model can be trained using a set of training data that include records of known issues, criticality levels, and associated corrective action plans. In such implementations, the adjustment apparatus 120 inputs the identified issue and criticality level into the machine learning model, which then outputs an appropriate corrective action plan. The recommended adjustments for a corrective action plan can be applied to the out-of-specification device as well as other plant devices.

Additionally, or alternatively, the adjustment apparatus 120 can utilize processing of the different risk factors by the risk processing apparatus 118 to determine and/or refine the corrective action plan. For example, if the risk processing apparatus 118 determines that a particular operational characteristic of the device can be adjusted by up to 35% and that operational characteristic needs to be adjusted by 10% for two weeks to maintain the plant's production capacity, the adjustment apparatus 120 can generate or refine the adjustment action plan to adjust that particular operational characteristic of the plant device by 10%. As another example, if the risk processing apparatus 118 determines that a particular operational characteristic of the device can be reduced by 5% and that other identical devices can be increased by 25% each to maintain the plant's production capacity, the adjustment apparatus 120 can generate or refine the adjustment action plan to adjust that particular operational characteristic of the other plant devices by 25%.

The type of corrective action plan determined by the adjustment apparatus 120 directly depends on the criticality level. In other words, the corrective action plan may use a relaxed risk mitigation approach involving minor adjustments to operations of one or more plant devices when the criticality level is LOW or MEDIUM, while using a more aggressive mitigation strategy complemented by swift external action (e.g., service, repairs, replacements) when the criticality level is HIGH or SEVERE. Below are examples of how the criticality level can affect the type of corrective action plan that may be implemented. For example, if the criticality level is "HEALTHY" or "LOW," the adjustment apparatus 120 may generate a corrective action plan that includes an adjustment action that improves or optimizes the operation of the plant. For example, if one or more devices are currently operating at 80% capacity and the risk processing apparatus 118 determines that these devices can operate at 85% capacity without any (immediate) adverse effects to the plant's operations, then the adjustment apparatus 120 can implement such an adjustment to improve the plant's performance.

As another example, if the criticality level if MEDIUM or HIGH, the adjustment apparatus 120 may generate a corrective action plan that includes an adjustment action that, e.g., reduces/lowers operation or capacity of the out-of-specification device and/or increases the output/capacity of one or more other devices (e.g., identical devices, other downstream or upstream devices). In such instances, the adjustment apparatus 120 may also generate an alert that informs the operator that the out-of-specification device can continue operating, e.g., at a certain reduced operational capacity for a certain period. In such instances, the corrective action plan may not take any immediate external action, such as order any parts or request any service or repair. Alternatively, the corrective action plan may schedule such external action to happen after the certain period has elapsed.

As another example, if the criticality level is SEVERE, the adjustment apparatus 120 may generate a corrective action plan that includes (1) an adjustment action that, e.g., reduces/lowers operation or capacity of the out-of-specification device and/or increases the output/capacity of one or more other devices, and (2) an alert indicating that the out-of-specification device can continue operating only for a limited time and that service/repairs must be scheduled immediately. In some implementations, in response to a SEVERE criticality level, the adjustment apparatus 120 can also immediately take external action, e.g., submit purchase orders for the required replacement parts and/or schedule service/repair with appropriate personnel.

If the adjustment apparatus 120 determines a particular adjustment action for one or more plant devices, it transmits this adjustment action command 204, via the network 150, to the device controller 148. For example, an adjustment action can be an instruction to reduce the operational speed of a motor of a plant device. As another example, an adjustment action can be an instruction to adjust the power draw of a plant device.

In implementations in which the adjustment action plan is automatically implemented, the device controller 148 parses the received adjustment action command 204 to identify the device/s for which adjustments need to be made and the corresponding adjustments for these devices. The device controller 148 converts the adjustment action for each identified device into an electrical signal (or other appropriate wireless or other electromechanical signals) that can be processed by the respective plant devices. For example, if the device adjustment action requires the motor speed of a manufacturing device to be reduced by 50%, the device controller 204 can send a signal to the manufacturing device 142-A, e.g., specifying the frequency of the motor that corresponds to 50% of the current operational speed. Upon receiving this signal, the manufacturing device adjusts the specified operational characteristic (e.g., adjusting operational frequency or rotational speed of a motor) by adjusting controls (e.g., changing physical positions of mechanical components, e.g., knobs, levers, and/or modifying settings for electric or digital components) of the manufacturing device. Further adjustments can include an instruction that results in a physical manipulation of some component on the manufacturing device (e.g., causing a motor or a robot to move a particular lever or knob).

In implementations in which the adjustment action plan is implemented by a human plant operator, the device controller 148 parses the received adjustment action command 204 to identify the device/s for which adjustments need to be made and the corresponding adjustments for these devices. The device controller 148 provides the identified device/s and the corresponding adjustments for these devices to a human plant operator, who can then implement the specified adjustments as determined by the device controller 148.

In the preceding paragraphs, the transmission of the adjustment action command 204 to the plant 140 can result in automatic adjustments of the one or more plant devices' operational characteristics (in the manner described above) or a manual adjustment of the one or more plant devices' operational characteristics by a human plant operator. Although certain operational characteristics can automatically be adjusted, in some scenarios, a plant operator may nevertheless configure the plant management system 110 to seek confirmation from the operator (e.g., by sending a request to the operator device 130 and waiting for a response from the operator) before sending the command to the device controller 204 to automatically implement the adjustments to the operational characteristics.

In some implementations, the adjustment actions can also specify certain actions that require operator intervention, e.g., physically replace parts and/or shut down the device during repair. In such scenarios, the plant management system 110 sends a message to the application running on the operator device 130, indicating the necessary operator intervention for the repair/corrective action. In response, the operator performs the necessary intervening steps before signaling to the plant management system 110 (e.g., via a confirmation sent from the operator device 130 to the plant management system) to send the adjustment action command 204 to the device controller, e.g., to implement the remaining operational characteristic adjustments required to complete the repair/corrective action.

In some implementations, the data analyzed and processed by the risk processing apparatus 118 and the adjustment apparatus 120 can be stored in association the identified out-of-specification device in a storage device. This data can include the operational characteristics of the out-of-specification device, the data related to the different risk factors (as described above), the risk assessments, and the determined corrective actions, including the adjustment actions. The plant management system 110 can use this data to generate visualizations that are presented in applications executing on the operator's device 130. For example, the generated visualizations can provide text and/or graphs (or other graphical information) that use this data to provide operational and risk reports specifying the current operational characteristics of the device, the identified issues, the risk assessment, and the adjustment action. An example of such a visualization is shown and described with reference to FIG. 4.

As described above, in some implementations, the device controller 148 can also generate alert indicating issues with one or more devices, including the device that was determined to be out of specification. The alert can include illuminating lights on (or near) the device (e.g., a "status" LED) and/or generating sounds (e.g., alarms) based on the identified issue and the determined criticality level. For example, a green LED can be illuminated for the "HEALTHY" or "LOW" critical levels, a yellow LED can be illuminated for the "MEDIUM" or "HIGH" criticality levels, and a red LED can be illuminated for the "SEVERE" criticality level. Additionally, or alternatively, different types of sounds can be sounded for each criticality level. Alternatively, or in addition to generating sounds and illuminating lights, the adjustment apparatus 120 can generate a notification including an alert (as described above) and transmit this notification via an appropriate communication channel (e.g., a text message, email, or other visualization) to an application executed at the operator device 130. In some implementations, the device controller 148 can also generate and/or schedule a work or maintenance request to perform the necessary work order or maintenance specified by the adjustment action.

Figure 3:
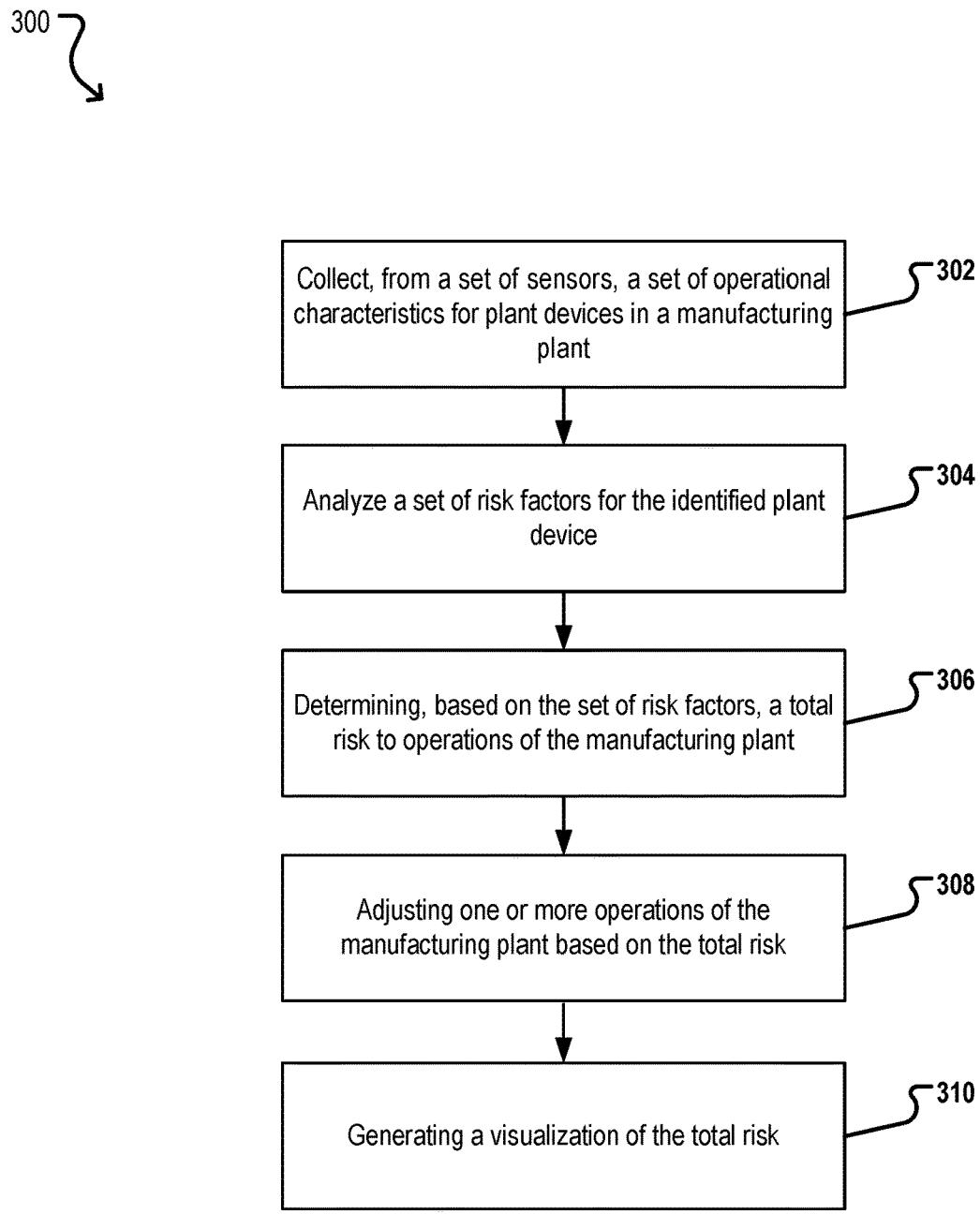
FIG. 3 is a flow chart of an example process for monitoring and adjusting the operations of a manufacturing plant based on an assessment of the risk to the plant's operations.

FIG. 3 is a flow chart of an example process 300 for monitoring and adjusting the operations of a manufacturing plant based on an assessment of the risk to the plant's operations. Operations of the process 300 can be implemented, for example, by the system components shown in FIGS. 1 and 2, and/or one or more data processing apparatus. In some implementations, operation of the process 300 can be implemented as instructions stored on a non-transitory computer readable medium, where execution of the instructions by one or more data processing apparatus cause the one or more data processing apparatus to perform operations of the process 300.

A set of operational characteristics for plant devices in the manufacturing plant is obtained (302). As described above with reference to FIGS. 1 and 2, sensor data is collected from a set of sensors (e.g., sound sensors, vibration sensors, flow rate sensors, etc.) and this sensor data is consolidated and transmitted as a single set of sensor data 202 to the plant management system 110. The sensor processing engine 116 (of the plant management system 110) processes this sensor data to determine operational characteristics of different plant devices of the manufacturing plant.

A set of risk factors are analyzed for a particular plant device (304). As described above with reference to FIGS. 1 and 2, the risk processing apparatus 118 analyzes a set of factors/parameters for the particular plant device and/or the plant in general, including the operational parameters 210-218 and 250 and/or additional risk factors (described above). As described above, these risk factors relate not only to the risk directly related to the failure of the identified plant device, but also to the risks associated with other operational factors that are indirectly affected by or indirectly affect the identified plant device. As such, the set of risk factors are used to assess the overall risk to the plant's operations.

An overall risk to the operations of the manufacturing plant is determined based on the set of the risk factors (306). As described above with reference to FIGS. 1 and 2, the risk processing apparatus can use a risk assessment model, which can be implemented, e.g., as a machine learning model or a rules-based engine, to determine an overall risk assessment to the plant's operations. Such implementations analyze and process the various risk factors/parameters (described above with reference to FIG. 2) to determine an overall risk score. Various risk score-based thresholds can be used to categorize the overall risk within one of multiple risk criticality levels, such as, e.g., SEVERE, HIGH, MEDIUM, LOW, and HEALTHY (as as described above with reference to FIG. 2).

One or more operations of the manufacturing plant is adjusted based on the total risk (308). As described above with reference to FIGS. 1 and 2, the adjustment apparatus 120 uses the total risk assessment to determine (e.g., using a lookup table or a machine learning model) the appropriate corrective actions. The corrective actions can be any one or more of adjusting operational characteristics (e.g., automatic adjustment or human operator-based adjustment) of one or more devices, which may include the identified out-of-specification device, and/or scheduling external action, which includes ordering parts, scheduling repairs/replacements, etc. (as described with reference to FIGS. 1 and 2). In some implementations, the adjustment apparatus 120 can utilize processing of the different risk factors by the risk processing apparatus 118 to determine and/or refine the corrective action plan (as described above with reference to FIGS. 1 and 2). The adjustment apparatus 120 sends the adjustment action command 204 to the device controller 148 of the plant, which then can transmit appropriate signals to the plant devices identified in the adjustment action command 204. Alternatively, the adjustment apparatus 120 can send a request for service or maintenance to an application executing on the operator's device 130, prompting the operator to schedule service, repairs, or maintenance and ordering any required parts of resources as appropriate.

A visualization of the total risk is generated (310). In some implementations, the data analyzed and processed by the risk processing apparatus 118 and the adjustment apparatus 120 is stored in a storage device. This data can then be used by the front-end server 112 of the plant management system 110 to generate visualizations that are presented in an application executing on the operator's device 130. As described with reference to FIGS. 1 and 2, the generated visualizations can provide text and/or graphs (or other graphical information) that use the stored data to provide operational and risk reports. An example of such a visualization is shown and described with reference to FIG. 4.

Figure 4:
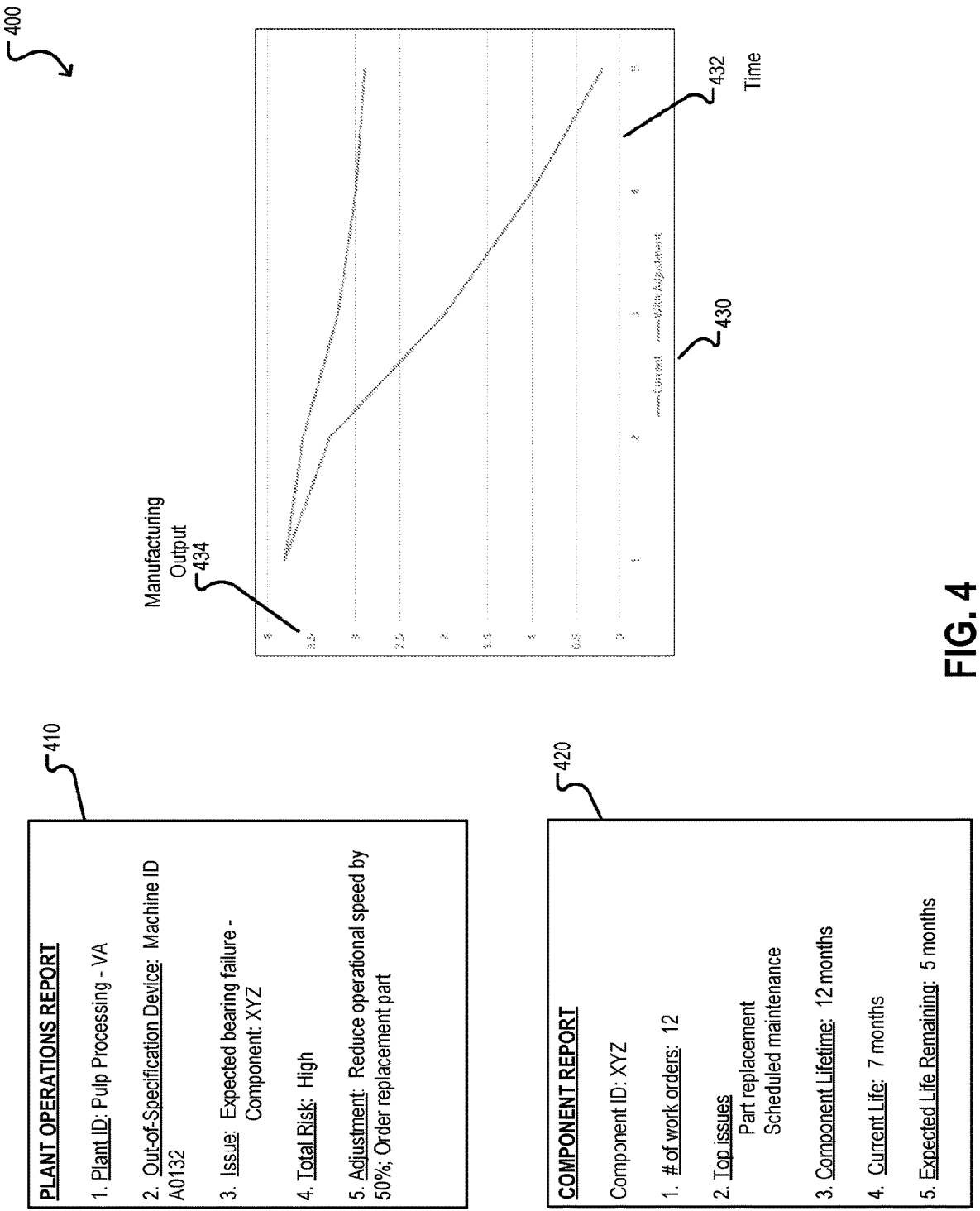
FIG. 4 is an example user interface visualization that is generated for presentation on an operator device.

FIG. 4 is an example user interface visualization 400 that is generated for presentation on an operator device 130.

The front end server 112 of the plant management system 110 generates the visualization 400 based on the data analyzed and processed by the plant management system 110 (as described above with reference to FIGS. 1 and 2). The visualization 400 include a plant operational report 410, a component report 420, and a graph 430 showing the actual and expected operational performance of the out-of-specification plant device over time.

The operational report 410 includes data identified by the risk processing apparatus 118 during its processing, as described above. As shown in FIG. 4, the operational report 410 includes an identification of the out-of-specification device, the identified issue, the total risk assessment, and the specified adjustment action.

The visualization 400 also includes a component report that provides additional detail about the component that has the identified issue. As described above with reference to FIG. 2, the risk processing apparatus 118 can extract this information from work orders, maintenance items, and service logs. As shown in FIG. 4, the component report identifies the number of work orders/log/items for this component, the most likely issues resulting in the issue with the component, and the component's current and expected lifetime.

The visualization 400 also includes a graph that charts the expected lifetime of the out-of-specification with and without the adjustment action and/or other corrective action. The expected lifetimes can be generated using data from the work orders, maintenance items, and service logs, as well as using modeling techniques (e.g., the above-described machine learning models), as described above with reference to FIG. 2.

Figure 5:
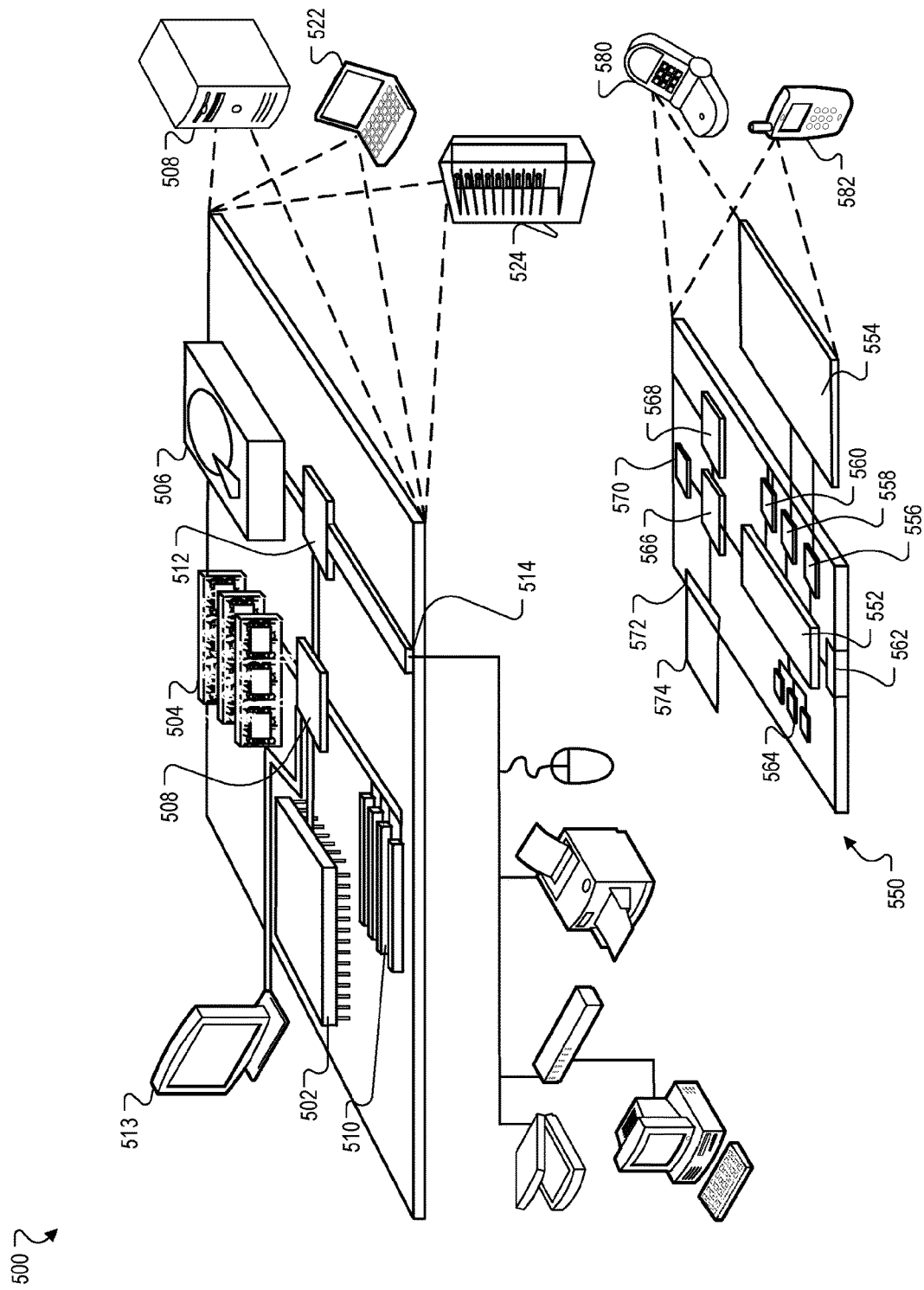
FIG. 5 is a block diagram of a computing system that can be used in connection with methods described in this specification.

FIG. 5 is a block diagram of computing devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 404 is a non-volatile memory unit or units.

The storage device 506 is capable of providing mass storage for the computing device 400. In one implementation, the storage device 506 is a computer-readable medium. In various different implementations, the storage device 506 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer implemented method, comprising:
   obtaining, using a set of sensors, a set of current operational characteristics for a plurality of plant devices in a manufacturing plant;
   analyzing, for a particular plant device, a set of risk factors corresponding to a failure of the particular plant device;
   determining, based on the set of risk factors, an overall risk posed by the particular plant device to operations of the manufacturing plant; and
   adjusting one or more operations of the manufacturing plant based on the overall risk,
   wherein adjusting one or more operations of the manufacturing plant based on the overall risk comprises:
   determining that overall risk satisfies a risk criticality threshold; and
   in response to determining that the overall risk satisfies the risk criticality threshold, adjusting one or more operational characteristics of a plant device other than the particular plant device or generating a request for service or maintenance of a plant device other than the particular plant device.

2. The computer implemented method of claim 1, further comprising:
   generating a visualization of the overall risk; and
   generating a request for service or maintenance of the particular plant device.

3. The computer implemented method of claim 1, wherein determining, based on the set of risk factors, an overall risk posed by the particular plant device to operations of the manufacturing plant, comprises:
   inputting, into a risk assessment model, an identifier for the particular plant device and the set of risk factors for the particular plant device, wherein the risk assessment model is trained on (i) historical risk factors for plant devices in the manufacturing plant and (ii) corresponding risk score representing risk to the operations of the manufacturing plant, and outputs a total risk to operations of the manufacturing plant; and
   obtaining, from the risk assessment model, an output specifying the total risk to the operations of the manufacturing plant.

4. The computer implemented method of claim 1, wherein adjusting one or more operations of the manufacturing plant based on the overall risk, comprises:
   determining that the overall risk satisfies a risk criticality threshold; and
   in response to determining that the overall risk satisfies the risk criticality threshold, adjusting one or more operational characteristics of the particular plant device.

5. The computer implemented method of claim 1, wherein determining, based on the set of risk factors, an overall risk posed by the particular plant device to operations of the manufacturing plant, comprises:
   determining a weighted risk for each of a plurality of operational parameters;
   determining a risk probability by aggregating the weighted risk for the plurality of operational parameters; and
   scaling the risk probability by a device criticality for the particular plant device to obtain the overall risk.

6. The computer implemented method of claim 1, further comprising:
   transmitting an alert message to an operator of the manufacturing plant when the overall risk satisfies a particular criticality threshold.

7. A system, comprising:
   one or more memory devices storing instructions; and
   one or more data processing apparatus that are configured to interact with the one or more memory devices, and upon execution of the instructions, perform operations including:
   obtaining, using a set of sensors, a set of current operational characteristics for a plurality of plant devices in a manufacturing plant;
   analyzing, for a particular plant device, a set of risk factors corresponding to a failure of the particular plant device;
   determining, based on the set of risk factors, an overall risk posed by the particular plant device to operations of the manufacturing plant; and
   adjusting one or more operations of the manufacturing plant based on the overall risk,
   wherein determining, based on the set of risk factors, the overall risk posed by the particular plant device to operations of the manufacturing plant comprises:
   determining a weighted risk for each of a plurality of operational parameters of the particular plant device;
   determining a risk probability by aggregating the weighted risk for the plurality of operational parameters; and
   scaling the risk probability by a device criticality for the particular plant device to obtain the overall risk.

8. The system of claim 7, wherein the one or more data processing apparatus are configured to perform operations further comprising further comprising:
   generating a visualization of the overall risk.

9. The system of claim 7, wherein determining, based on the set of risk factors, an overall risk posed by the particular plant device to operations of the manufacturing plant, comprises:
   inputting, into a risk assessment model, an identifier for the particular plant device and the set of risk factors for the particular plant device, wherein the risk assessment model is trained on (i) historical risk factors for plant devices in the manufacturing plant and (ii) corresponding risk score representing risk to the operations of the manufacturing plant, and outputs a total risk to operations of the manufacturing plant; and
   obtaining, from the risk assessment model, an output specifying the total risk to the operations of the manufacturing plant.

10. The system of claim 7, wherein adjusting one or more operations of the manufacturing plant based on the overall risk, comprises:
    determining that the overall risk satisfies a risk criticality threshold; and
    in response to determining that the overall risk satisfies the risk criticality threshold, adjusting one or more operational characteristics of the particular plant device.

11. The system of claim 7, wherein adjusting one or more operations of the manufacturing plant based on the overall risk, comprises:
    determining that the overall risk satisfies a risk criticality threshold; and
    in response to determining that the overall risk satisfies the risk criticality threshold, adjusting one or more operational characteristics of a plant device other than the particular plant device.

12. The system of claim 7, wherein the one or more data processing apparatus are configured to perform operations further comprising:

transmitting an alert message to an operator of the manufacturing plant when the overall risk satisfies a particular criticality threshold.

13. A non-transitory computer readable medium storing instructions that, when executed by one or more data processing apparatus, cause the one or more data processing apparatus to perform operations comprising:

obtaining, using a set of sensors, a set of current operational characteristics for a plurality of plant devices in a manufacturing plant;

analyzing, for a particular plant device, a set of risk factors corresponding to a failure of the particular plant device;

determining, based on the set of risk factors, an overall risk posed by the particular plant device to operations of the manufacturing plant; and adjusting one or more operations of the manufacturing plant based on the overall risk, wherein adjusting one or more operations of the manufacturing plant based on the overall risk comprises:

determining that the overall risk satisfies a risk criticality threshold; and in response to determining that the overall risk satisfies the risk criticality threshold, adjusting a plurality of operational characteristics of the particular plant device.

14. The non-transitory computer readable medium of claim 13, wherein the instructions cause the one or more data processing apparatus to perform operations comprising:

generating a visualization of the overall risk.

15. The non-transitory computer readable medium of claim 13, wherein determining, based on the set of risk factors, an overall risk posed by the particular plant device to operations of the manufacturing plant, comprises:

inputting, into a risk assessment model, an identifier for the particular plant device and the set of risk factors for the particular plant device, wherein the risk assessment model is trained on (i) historical risk factors for plant devices in the manufacturing plant and (ii) corresponding risk score representing risk to the operations of the manufacturing plant, and outputs a total risk to operations of the manufacturing plant; and obtaining, from the risk assessment model, an output specifying the total risk to the operations of the manufacturing plant.

16. The non-transitory computer readable medium of claim 13, wherein determining, based on the set of risk factors, an overall risk posed by the particular plant device to operations of the manufacturing plant, comprises:

determining a weighted risk for each of a plurality of operational parameters;

determining a risk probability by aggregating the weighted risk for the plurality of operational parameters; and scaling the risk probability by a device criticality for the particular plant device to obtain the overall risk.

17. The non-transitory computer readable medium of claim 13, wherein adjusting one or more operations of the manufacturing plant based on the overall risk, comprises:

determining that the overall risk satisfies a risk criticality threshold; and in response to determining that the overall risk satisfies the risk criticality threshold, adjusting one or more operational characteristics of a plant device other than the particular plant device.

* * * * *